US005994282A

United States Patent [19]
Lallier

[11] Patent Number: 5,994,282
[45] Date of Patent: Nov. 30, 1999

[54] STRIPPING COMPOSITION BASED ON POLAR APROTIC SOLVENT, AN ETHER AND WATER

[75] Inventor: Jean-Pierre Lallier, Courbevoie, France

[73] Assignee: Elf Atochem, S.A., Puteaux, France

[21] Appl. No.: 08/866,052

[22] Filed: May 30, 1997

[30] Foreign Application Priority Data

May 31, 1996 [FR] France ................................. 96 06735

[51] Int. Cl.[6] .............................. C09D 9/00; C11D 7/50; B08B 3/08
[52] U.S. Cl. ......................... 510/203; 510/201; 510/202; 510/206; 510/212; 510/500; 510/505; 510/506; 134/38
[58] Field of Search ..................... 510/202, 203, 510/206, 212, 201, 407, 500, 501, 505, 506; 134/38

[56] References Cited

U.S. PATENT DOCUMENTS

| | | | |
|---|---|---|---|
| 4,098,719 | 7/1978 | Hushebeck | 252/364 |
| 4,171,240 | 10/1979 | Wong | 156/630 |
| 4,401,748 | 8/1983 | Ward, Jr. et al. | 430/258 |
| 4,518,518 | 5/1985 | Koch | 252/142 |
| 4,591,391 | 5/1986 | Shimizu et al. | 134/22.17 |
| 4,623,611 | 11/1986 | West | 430/329 |
| 4,744,834 | 5/1988 | Haq | 134/38 |
| 4,854,973 | 8/1989 | Holdar | 134/39 |
| 4,956,115 | 9/1990 | Van De Mark | 252/170 |
| 4,983,224 | 1/1991 | Mombrun et al. | 134/40 |
| 4,992,187 | 2/1991 | Adams et al. | 252/50 |
| 5,011,621 | 4/1991 | Sullivan | 252/162 |
| 5,155,011 | 10/1992 | Zertani et al. | 430/331 |
| 5,155,012 | 10/1992 | Joerg et al. | 430/331 |
| 5,232,515 | 8/1993 | Sullivan | 134/38 |
| 5,308,527 | 5/1994 | Lallier et al. | 252/162 |
| 5,456,853 | 10/1995 | Myers, II | 252/170 |
| 5,468,422 | 11/1995 | Khouzam et al. | 252/544 |
| 5,565,136 | 10/1996 | Walsh | 510/203 |

FOREIGN PATENT DOCUMENTS

| | | |
|---|---|---|
| 573339 | 12/1993 | European Pat. Off. . |
| 93/07227 | 4/1993 | WIPO . |

OTHER PUBLICATIONS

Hansen, Charles M., "The Three Dimensional Solubility Parameter—Key to Paint Component Affinities: I", Journal of Paint Technology, 505(39), 104–117, Feb. 1967.

Hansen, Charles M., "The Three Dimensional Solubility Parameter—Key to Paint Component Affinities: II", Journal of Paint Technology, 511(39), 505–510, Aug. 1967.

Hansen, Charles M., et al., "The Three Dimensional Solubility Parameter—Key to Paint Component Affinities: III", 511(39), 511–514, Aug. 1967.

Kirk–Othmer, Encyclopedia of Chemical Technology, 2d ed., Supp. vol., pp. 889–910, month not known 1971.

*Primary Examiner*—Yogendra Gupta
*Assistant Examiner*—Gregory E. Webb
*Attorney, Agent, or Firm*—Millen, White, Zelano & Branigan, P.C.

[57] ABSTRACT

Stripping compositions based on a polar aprotic solvent, an ether and water. The composition is characterized in that it comprises at least the following: 1) a polar aprotic solvent, especially dimethyl sulfoxide (DMSO) or N-methyl pyrrolidinone (NMP); 2) an ether chosen from anisole and tetrahydrofuran (THF); 3) water.

22 Claims, No Drawings

STRIPPING COMPOSITION BASED ON POLAR APROTIC SOLVENT, AN ETHER AND WATER

CROSS-REFERENCE TO RELATED APPLICATION

This application is related to Applicants' co-pending application Ser. No. 08/866,0545 filed May 30, 1997, based on French application No. 96/06736 filed May 31, 1996, and assigned to the same Assignee as the present application.

BACKGROUND OF THE INVENTION

The present invention relates to a stripping composition for paints, varnishes or lacquers covering a substrate.

Strippers for paints and varnishes or lacquers are employed in two ways: by deposition or by immersion. The strippers applied by deposition are generally applied by brushing or spraying. They almost always contain a thickener and are employed at ambient temperature (20° C.). They are employed for small tasks or for objects to be stripped which cannot be immersed. This category includes stripping by the general public, professional stripping in the building trade and aeronautical stripping. The strippers using immersion employ either cold baths (often based on methylene chloride) or hot baths (often based on caustic soda). They are employed above all for the stripping of a large number of small articles (industrial stripping).

A stripping composition including, by volume, from 1 to 20% of a polar aprotic solvent such as dimethyl sulphoxide, (DMSO) or N-methylpyrrolidinone (NMP), and from 99 to 80% of an ether such as tetrahydrofuran is already known from EP 0 490 726.

A stripping composition including, by volume, from 1 to 20% of a polar aprotic solvent like DMSO and NMP and from 99 to 80% of an ether exhibiting a flash point higher than 0° C., a molecular volume smaller than 160 and a molecule provided with one or more methoxy groups is already known from EP 0573 339; this ether may be especially anisole.

Although very efficient in their stripping action, these two stripping compositions above have, nevertheless, the disadvantage of being costly.

Furthermore, WO 93/07227 discloses the addition of water to solvents or to solvent mixtures considered to be efficacious in paint stripping. This document describes compositions containing 1) at least one organic solvent chosen from ethyl acetate, methyl ethyl ketone and toluene, 2) water, 3) at least one thickener and 4) at least one surfactant.

The effectiveness of these compositions is simply proportional to the quantity of organic solvent employed and, in any way, is lower than the effectiveness of the pure solvent.

There is thus a need in the stripper industry to find other compositions whose cost is lower, but which are at least as effective as the compositions of the prior art.

SUMMARY OF THE INVENTION

It has now been found that aqueous compositions of the water-solvent type have a higher paint-stripping effectiveness than that of the solvent employed without water.

More precisely, the present invention lies in a stripping composition for paints, varnishes or lacquers, characterized in that it comprises at least the following three constituents:

1) a polar aprotic solvent,
2) an ether preferably chosen from anisole and tetrahydrofuran (THF),
3) water.

For example, in the case where the aprotic polar solvent is DMSO, the combination of these three constituents is much more effective than each of the three binary compositions DMSO-ether, DMSO-water and water-ether. In the case of some compositions of these three constituents, results which are surprising in terms of shortness of the stripping period have been obtained. Water acts as a constituent besides DMSO and ether. This invention can be employed in the various sectors of paint stripping:

general public stripping,
professional stripping in building,
industrial stripping,
aeronautical stripping.

The polar aprotic solvent is advantageously dimethyl sulphoxide (DMSO).

The polar aprotic solvent is advantageously N-methylpyrrolidinone (NMP).

The constituents are advantageously present in the following proportions:
1) the polar aprotic solvent from 1 to 75 parts by weight,
2) the ether from 10 to 90 parts by weight,
3) water from 1 to 90 parts by weight.

The composition preferably includes:
1) the polar aprotic solvent from 25 to 65 parts by weight,
2) the ether from 10 to 40 parts by weight,
3) water from 10 to 40 parts by weight.

The composition advantageously includes:
1) 10 parts by weight of DMSO,
2) 25 parts by weight of anisole,
3) 62 parts by weight of water.

The composition advantageously includes:
1) 50 parts by weight of DMSO (aprotic polar solvent),
2) 25 parts by weight of anisole,
3) 25 parts by weight of water.

The composition advantageously includes:
1) 70 parts by weight of DMSO,
2) 15 parts by weight of THF,
3) 15 parts by weight of water.

The composition advantageously includes:
1) 50 parts by weight of DMSO,
2) 25 parts by weight of THF,
3) 25 parts by weight of water.

The composition advantageously includes:
1) 50 parts by weight of NMP,
2) 25 parts by weight of anisole,
3) 25 parts by weight of water.

The composition according to the invention preferably contains one or a number of other constituents chosen from an activator, a thickener and a corrosion inhibitor.

The activator may be, for example, chosen from monoethanolamine, aqueous ammonia at a concentration of 30% in water, and formic acid.

The thickener may be, for example, a cellulose-based or polyacrylic compound.

The corrosion inhibitor may be, for example, sodium benzoate.

In addition to the preceding description, the invention will be understood better with the aid of the following examples.

In all these examples the content of each constituent of the compositions is shown as a percentage by weight on the basis of the total weight of the composition.

EXAMPLE 1

DMSO-anisole-water ternary

Paints of the motor vehicle industry were employed for employing the compositions in the industrial sector (40° C.

hot immersion). The paints are Herberts Glacier White 389 polyester lacquers supplied by the Etalon company (France). The thickness of the coating is 35 to 45 μm. The metal panels employed are made of phosphated steel and have a rectangular covered surface of 90×190 mm. The performance on these panels can be generalized to other paints which are easier to strip than the polyester paints, which is generally the case with glycerophthalics, alkyds and acrylics. The synergy effect of the DMSO-anisole-water ternary is clearly shown by the following results which appear in Table I:

TABLE I

|   | Stripping time[1] (seconds) |
|---|---|
| DMSO/anisole (30/70) | 260 |
| anisole/water (25/75)[2] | 245 |
| DMSO/anisole/water (50/25/25)[2] | 217 |

1 Obtained by impregnating a piece of cotton wool at a temperature of 20° C.
2 The emulsion is homogenized before use.

Pure DMSO does not produce any stripping after 4 hours and pure anisole gives a time of 410 seconds.

EXAMPLE 2

DMSO-anisole-water ternary in industrial stripping (polyester paints)

The panels, the paints and their deposition are identical with those of Example 1. Here the tests are carried out in a stirred bath at 40° C. by immersion simulating the conditions of industrial stripping. The synergy effect of the DMSO-anisole-water ternary is clearly shown by the following results in Table II:

TABLE II

|   | Stripping time[1] (seconds) |
|---|---|
| DMSO/anisole (30/70) | 240 |
| DMSO/water (50/50) | >1200 |
| DMSO/anisole/water (50/25/25) | 120 |

1 In a stirred bath at 40° C.

The DMSO/anisole/water ternary is in the form of an unstable emulsion which requires the bath to be stirred.

EXAMPLE 3

DMSO-anisole-water ternary in industrial stripping (epoxy paints)

For this example, the test paint is a Herberts AC 27 epoxy electrostatic spray supplied by the Etalon company. The ternary was compared with the DMSO/benzyl ether (BE) binary system. The advantage of this mixture is that the temperature can be raised above 40° C. when dealing with a paint which is difficult to strip. The relatively high flash point of benzyl ether (higher than 100° C.) allows the use of temperatures higher than 40° C. The DMSO/benzyl ether system constitutes an advantageous reference for industrial stripping. The effectiveness of the DMSO-anisole-water ternary is clearly shown by the following results in Table III:

TABLE III

|   | Stripping time[1] (minutes) |
|---|---|
| DMSO/BE (50/50) | 30 |
| DMSO/anisole/water (50/25/25) | 30 |
| activated[1] DMSO/BE | 15 |
| activated[1] DMSO/anisole/water | 15 |

1 Activation with monoethanolamine (1%)
2 Bath at 40° C., stirred

EXAMPLE 4

DMSO-anisole-water ternary on a glycerophthalic paint

After 30 min, the DMSO-anisole-water ternary strips six coats of 25 μm thickness of a glycerophthalic paint deposited on wood. This effectiveness is obtained by employing the following proportions: DMSO/anisole/water=50/25/25. The same performance is obtained with the DMSO/anisole (30/70) system.

EXAMPLE 5

DMSO-THF-water ternary

The DMSO-THF-water ternary was investigated on the same paint and in the same conditions as Example 1. THF is a well-known paint-swelling agent as described in Patent CH 670832. However, this solvent remains highly flammable and difficult to use. When compared with pure THF, the addition of DMSO and water makes it possible to obtain a clear improvement in the stripping time, as can be seen in the following Table IV:

TABLE IV

|   | Stripping time[1] (seconds) |
|---|---|
| THF (100) | 60 |
| THF/water/DMSO (70/15/15) | 43 |
| THF/water/DMSO (50/25/25) | 65 |
| THF/water (50/50) | 165 |
| THF/DMSO (50/50) | 115 |

1 Obtained by impregnating a piece of cotton wool at a temperature of 20° C.

EXAMPLE 6

Thickened DMSO-anisole-water ternary

By choosing certain composition ranges of the ternary it is easily possible to thicken it with a cellulose-based thickener. We have optimized the following formulation: DMSO (10%)—anisole (25%)—water (62%)—methocell (3%). The effectiveness of this thickened formulation was verified on a number of paints: an acrylic roughcast, a glycerophthalic and a polyester. We have compared this formulation with a competitive thickened stripper containing NMP (10%) (N-methylpyrrolidone), DEE (40%) (dibasic ester), water (48.7%) and methocell (1.3%). After one hour the acrylic roughcast is scratched. The DMSO-based formulation enables the substrate to be reached. On the glycerol paint the DMSO-based formulation attacks three 25-μm coats, each in 30 minutes. Finally, on the polyester the DMSO-based formulation gives a time of the order of 40 minutes. In the case of the NMP-based competitive formulation the attack of the acrylic roughcast is only partial after one hour (the substrate is not reached). No effect is obtained on glycerophthalic paint after one hour. Finally, the stripping time on the polyester is longer than 4 hours. Our results therefore clearly show the advantage of our formulation over the competitive formulation.

EXAMPLE 7

NMP-anisole-water ternary

The tests were performed in the same conditions as those in Example 1. The following results in Table V show the effect of water on the NMP-anisole system:

TABLE V

|  | Stripping time[1] (minutes) |
|---|---|
| NMP/anisole (30/70) | 6 |
| NMP/anisole/water (50/25/25) | 4.5 |

1 Obtained by impregnating a piece of cotton wool at a temperature of 20° C.

Aside from the polar aprotic solvents mentioned above, other species of polar aprotic solvents include, but are not limited to: $CH_3N$, DMF (dimethylformamide), diethyl carbonate, dipropyl carbonate, and DMAC (dimethylacetamide). Also, other species of ether include, but are not limited to: 1,3-dioxolane, dioxane and methyl-tertiarybutyl ether (MTBE).

The preceding examples can be repeated with similar success by substituting the generically or specifically described reactants and/or operating conditions of this invention for those used in the preceding examples.

The entire disclosure of all applications, patents and publications, cited above and below, and of corresponding French application No. 96/06735, are hereby incorporated by reference.

From the foregoing description, one skilled in the art can easily ascertain the essential characteristics of the invention, and without departing from the spirit and scope, thereof, can make various changes and modifications of the invention to adapt it to various usages and conditions.

I claim:

1. A stripping composition for paints, varnishes or lacquers, comprising at least the following three constituents:

1) a polar aprotic solvent;
    2) an ether selected from the group consisting of anisole and tetrahydrofuran (THF);
    3) water in a concentration of at least 15%, by weight of the total composition and in a proportion wherein the water is present in relative amounts so as to afford a higher stripping effectiveness than without water.

2. A composition acccording to claim 1, wherein the polar aprotic solvent is N-methylpyrrolidinone (NMP).

3. A composition according to one of claim 1 wherein the constituents are present in the following proportions:

1) the polar aprotic solvent from 1 to 75 parts by weight;
    2) the ether from 0 to 90 parts by weight;
    3) water from 1 to 90 parts by weight.

4. A composition according to claim 3, wherein the constituents are present in the following proportions:

1) the polar aprotic solvent from 25 to 65 parts by weight;
    2) the ether from 10 to 40 parts by weight;
    3) water from 10 to 40 parts by weight.

5. A composition according to claim 4, including:

1) 50 parts by weight of DMSO (aprotic polar solvent);
    2) 25 parts by weight of anisole (the ether);
    3) 25 parts by weight of water.

6. A composition according to claim 3, including:

1) 10 parts by weight of DMSO (aprotic polar solvent);
    2) 25 parts by weight of anisole (ether);
    3) 62 parts by weight of water.

7. A composition according to claim 3, including:

1) 70 parts by weight of DMSO (aprotic polar solvent);
    2) 15 parts by weight of THF (ether);
    3) 15 parts by weight of water.

8. A composition according to claim 4, including:

1) 50 parts by weight of DMSO (aprotic polar solvent);
    2) 25 parts by weight of THF (ether);
    3) 25 parts by weight of water.

9. In a method of stripping paints, varnishes or lacquers, comprising applying a stripping composition to an object, the improvement wherein the stripping composition is in accordance with claim 1.

10. In a method of stripping paints, varnishes or lacquers, comprising applying a stripping composition to an object, the improvement wherein the stripping composition is in accordance with claim 2.

11. In a method of stripping paints, varnishes or lacquers, comprising applying a stripping composition to an object, the improvement wherein the stripping composition is in accordance with claim 3.

12. In a method of stripping paints, varnishes or lacquers, comprising applying a stripping composition to an object, the improvement wherein the stripping composition is in accordance with claim 4.

13. In a method of stripping paints, varnishes or lacquers, comprising applying a stripping composition to an object, the improvement wherein the stripping composition is in accordance with claim 5.

14. In a method of stripping paints varnishes or lacquers, comprising applying a stripping composition to an object, the improvement wherein the stripping composition is in accordance with claim 7.

15. A stripping composition for paints, varnishes or lacquers, comprising at least the following three constituents:

1) a polar aprotic solvent;
    2) an either;
    3) water in a concentration of at least 15% by weight of the total composition and in a proportion wherein the water is present in relative amount so as to afford a higher stripping effectiveness than without water.

16. A stripping composition for paints, varnishes or lacquers, comprising at least the following three constituents:

(1) a polar aprotic solvent selected from the group consist of dimethyl sulphoxide, N-methylpyrrolidinone, trimethylamine, dimethylformamide, diethyl carbonate, dipropyl carbonate, and dimethylacetamide;
    (2) an ether selected from the group consisting of anisole, tetrahydrofuran, 1,3-dioxolane, dioxane, and methyl-tertiarybutyl ether; and
    (3) water in a concentration of at least 15% by weight of the total composition and in a proportion wherein the water is present in relative amounts so as to afford a higher stripping effectiveness without water.

17. In a method of stripping paints, varnishes or lacquers, comprising applying a stripping composition to an object, the improvement wherein the stripping composition is in accordance with claim 16.

18. A stripping composition for paints, varnishes or lacquers, comprising at least the following tree constituents:
   1) a polar aprotic solvent, comprising dimethyl sulphoxide (DMSO);
   2) an ether selected from the group consisting of anisole and tetrahydrofuran (THF);
   3) water in a concentration of at least 15% by weight of the total composition and in a proportion wherein the water is present in relative amounts so as to afford a higher stripping effectiveness than without water.

19. A stripping composition for paints, varnishes or lacquers, comprising at least the following three constituents:
   1) a polar aprotic solvent;
   2) an ether selected from the group consisting of anisole and tetrahydrofuran (THF),
   3) water in a concentration of at least 15% by weight of the total composition and in a proportion wherein the water is present in relative amounts so as to afford a higher stripping effectiveness than without water; and
   4) at least one other constituent selected from the group consisting of an activator, a thickener and a corrosion inhibitor.

20. A stripping composition for paints, varnishes or lacquers, comprising at least the following three constituents:
   1) a polar aprotic solvent, comprising 50 parts by weight of NMP (polar aprotic solvent);
   2) 25 parts by weight of anisole (ether), and
   3) 25 parts by weight of water.

21. In a method of stripping paints, varnishes or lacquers, comprising applying a stripping composition to an object, the improvement wherein the stripping composition is in accordance with claim 18.

22. In a method of stripping paints, varnishes or lacquers, comprising applying a stripping composition to an object, the improvement wherein the stripping composition is in accordance with claim 18.

* * * * *